Sept. 20, 1955   B. D. SMITH   2,718,162
BUCKET TOOTH REPOINTING
Filed June 23, 1952

Belmont D. Smith
INVENTOR.

BY *Clarence A. O'Brien*
*and Harvey B. Jackson*
Attorneys

United States Patent Office 2,718,162
Patented Sept. 20, 1955

2,718,162

BUCKET TOOTH REPOINTING

Belmont D. Smith, Eaton, Ohio

Application June 23, 1952, Serial No. 295,102

8 Claims. (Cl. 76—101)

This invention relates to a bucket tooth repointer and particularly to a repointer and method of applying it to a steel or manganese bucket tooth to restore the utility of the bucket tooth.

In the operation of earth moving machinery such as drag line and shovel dipper buckets the tonnage handled by the dipper or other earth moving machinery is almost proportional to the sharpness of the teeth of the machinery. The machinery being able to handle a much larger yardage of material when the bucket teeth are in good sharp condition than when the teeth are dull and rounded off from wear.

In order to provide teeth having the necessary strength and tenacity to repeatedly operate in hard ground or other hard digging it is customary to use a manganese or steel alloy tooth which is tough and tenacious and has sufficient strength to do the necessary prying or lifting as incident to such earth working operations. Manganese alloy teeth have the desired toughness and strength but are relatively soft. After a series of operations the ends of the tooth become worn off so that the teeth are short and blunt and a great deal of energy is necessary to produce any useful operation with such worn off and blunted teeth.

It has heretofore been attempted to repoint such manganese teeth by applying various alloys directly to the worn surfaces by means of electric welding or other welding operations. However, manganese teeth have the peculiar property that any hard steel alloy applied to the manganese tips cause the hardening elements to be absorbed by the manganese or the manganese migrates into the hardened allow so that the hardness substantially disappears and there is little if any gain in hardness over the original manganese teeth. Therefore, it has heretofore been customary to wear the teeth down to the point where there is too much energy expended to secure useful work therewith and to replace the teeth with new manganese teeth or weld on shaped manganese slugs or manganese bars cut to shape to which the above also applies.

The present method provides an improved pointer and method of attaching the same to a dull or worn bucket tooth so as to substantially renew the point with a hard long wearing metal and to prevent the absorption of the carbon from the point into the manganese tooth or the transfer of manganese into the new alloy to cause softening thereof.

The object of the invention is secured by providing a repointer constructed of a hard preferably high carbon alloy steel and wash welding a coating of high nickel alloy steel onto the worn surface of the original tooth to provide a coating of high nickel content on the surface of the tooth and at the same time to convert the work hardened surface of the tooth to relatively soft austenite manganese. The matching edge of the repointer is shaped to fit the contour of the worn tooth and sloped away to provide with the surface of the tooth a V-shaped notch and the entire surface to be joined to the tooth is also wash coated with a high nickel content alloy to prevent migration of the carbon into the weld or into the original manganese tooth. The repointer or slug and the original tooth are arranged in proximity to each other and tack welded together after which they are electrically welded together by means of a welding rod depositing an alloy of high tensile strength in the weld.

It is accordingly an object of the invention to provide a manganese tooth having a hard point.

It is a further object of the invention to provide a method of repairing a manganese tooth.

It is another object of the invention to provide a method of preventing migration of alloys between a manganese tooth and an alloy point.

It is a further object of the invention to provide a dipper tooth having a transverse alloy blocking layer therein.

Other objects and many of the attendant advantages of this invention will be apparent from the following detailed description taken in conjunction with the accompanying drawing in which.

Figure 1:
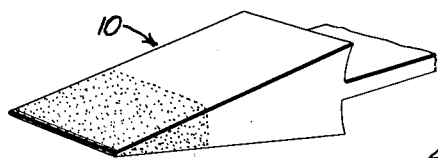
Figure 1 is a perspective view of an improved tooth according to the invention.

In the exemplary embodiment according to the invention, a tooth indicated generally at 10 is provided with a base 12 of high manganese alloy. Usually the base 12 is a worn down manganese tooth, however, it is apparent that the base 12 may be a manganese blank instead of a worn down manganese tooth. The base 12 and particularly if it is a worn down tooth is provided with a worn surface 14 which will usually be curved in all directions to provide an arcuate tip with a curved front edge as shown at 16. If the surface 14 was provided by wearing down a manganese tooth it will be found to be extremely hard or so-called work hardened material particularly if the tooth has been digging into stony or other strenuous digging. Manganese teeth particularly work hardened teeth are extremely hard to operate by the usual cutting tools or cutting torches as the tenacity and toughness of the material is one of its particular desirable features. A repoint 18 is provided in any suitable way such as by providing a bar 20 of substantially wedge shaped cross section from which a blank 22 may be cut having the length equal to the width of the tooth body 12.

Since the body 12 is exceedingly tough and tenacious and hard to operate the back edge 24 of the blank 22 is provided with an arcuate contour 26 substantially matching the contour of the front surface 14 of the base 12. The back edge 24 is then beveled as at 28 and 30 so that when the repointer 18 is arranged in proximity to the front 14 of the base 12 will provide a pair of substantially V-shaped grooves 32 and 34.

While the hard alloy steels are unsuitable for entire teeth because of their lack of mechanical strength to stand the loads necessary the repointer 18 made from the blank 22 may and preferably is constructed of a hard high carbon alloy steel or this alloy steel point can be hard faced with a suitable material so that it will have sufficient hardness to have a reasonably long wear even in strenuous digging operations. The necessary short length of the repointer 18 allows the relatively weaker hard steel to stand up under the operation.

Since in normal operations by welding the repointer 18 to the base 12 the carbon of the repointer 18 would migrate or be absorbed into the manganese material or the manganese and carbon from the bucket point migrate into the weld to such an extent that it may cause brittleness and weakness of the weld joint, it is necessary to provide a means for preventing migration of the alloys between the repointer 18 and the base 12. Likewise, it is desirable to rework the work hardened surface 14 as it is normally hard and quite brittle and does not make good weld material. Accordingly a wash 40 is applied to the surface 14 by striking an arc between a welding rod having a high nickel content such as stainless steel or preferably the material sold under the trademark "Mangaloy W." Obviously any high nickel steel rod may be used and the arc is struck to the base 12 so a nickel base rod is applied to treat the surface 14 and change the hardened surface to austenite manganese which is relatively soft and will readily hold welding. The surfaces 28 and 30 of the repointer 18 are likewise washed with a high nickel alloy to provide surfaces 42 and 44.

The body 12 and the repointer 18 are then assembled in spaced relation with a gap of the order of one-eighth of an inch between the surface 26 and the surface 14. The repointer and the body are then welded together and the weld is produced by substantially filling one-half of the uppermost V-shaped groove such as 32 with a filling deposited from a welding rod which deposits arc material of high tensile strength. In order to produce a high strength weld the arc is struck and the groove filled to substantially half its capacity at a single passage of the electrode through the groove. Where it is impossible to deposit sufficient material with a single passage a series of heavy stringer beads is utilized to fill the groove as it has been found that a light weaving bead causes a weak joint.

The half filled groove is allowed to cool to a temperature to the order of 600° after which the rod is again applied and arc struck and the groove completely filled with the high tensile material. A blank is then turned over and the opposite groove such as the groove 34 is similarly treated. The groove 34 being first substantially half filled with a high tensile material cooled and then completely filled.

Figure 2:
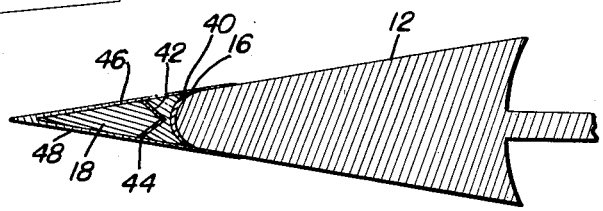
Figure 2 is a longitudinal vertical sectional view through the tooth showing the various portions thereof.
Figure 3:
Figure 3 is an alloy steel or carbon steel bar for cutting repointer blanks therefrom.
Figure 4:
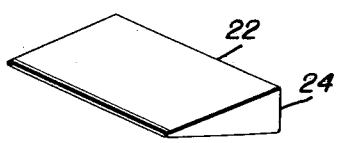
Figure 4 is a blank cut from the bar of Figure 3.
Figure 5:
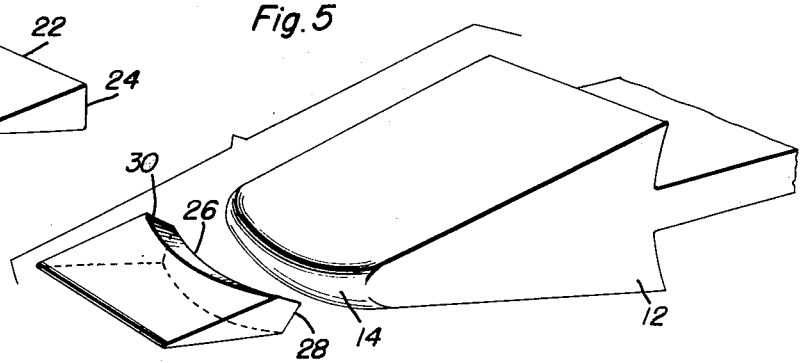
Figure 5 is a perspective view of a worn tooth with a contoured repointer for connection thereto.
Figure 6:
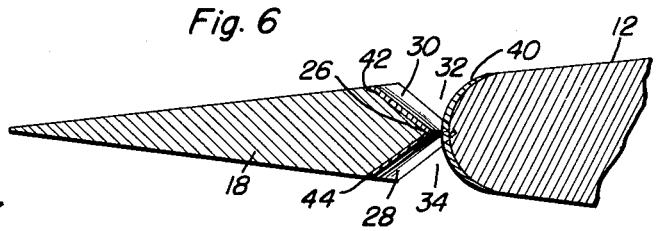
Figure 6 is a longitudinal vertical section through the repointer and the tooth in assembled relation ready for the welding operation.
Figure 7:
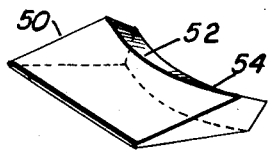
Figure 7 is a perspective view of a cast repointer blank according to the invention.

Since the welding material will be of relatively soft, high tensile strength material it is desirable to protect the surface of the weld. A suitable layer 46 of hard facing material should be applied completely over point 18 and extending back over the welding in grooves 32 and 34 as shown in Figure 2.

The bar 20 from which blanks 22 are cut is particularly convenient when various widths of teeth are to be repointed. However, it is frequently desirable to have points which may be readily applied without the necessary operations of cutting and trimming to produce the points 18. Consequently points 50 may be provided as individual units for the various widths of teeth and if only one width of a tooth is used on the job obviously only one width of pointers 50 will need to be carried thereon. Instead of cutting these points from bars 20 they are preferably cast as individual units with the necessary bevel surfaces 52 thereon. Likewise if desired the wash coat 54 may be applied to the blank 50 at the factory so that it will save time and operation on the field.

The high nickel wash coatings 40 and 42 substantially prevent transfer of alloy materials between the tip 18 and the body 12 so that the manganese from the body 12 does not soften the tip 18 and the finished product will have a high strength body 12 and a hard working tip 18 which produces a relatively long lifed fast cutting tool.

It will thus be seen that the present invention provides dipper bucket teeth which will have an extremely long life and a good cutting edge.

For purposes of exemplification a particular embodiment of the invention has been shown, and described according to the best present understanding thereof. However, it will be apparent to those skilled in the art, that many changes and modifications can be made therein without departing from the true spirit of the invention.

Having described the invention, what is claimed as new is:

1. The steps in repointing a manganese tooth comprising wash coating the worn surface of the tooth with stainless steel, providing a hard steel alloy point, shaping the base of said point to substantially fit the washed surface, tack welding said point to said tooth to provide a V-groove between said wash coat on said tooth and said point, filling said groove with high tensile strength welding alloy.

2. The steps in repointing a manganese tooth comprising wash coating the worn suface of the tooth with stainless steel, providing a hard steel alloy point, shaping the base of said point to substantially fit the washed surface, tack welding said point to said tooth to provide a V-groove between the wash coat on said tooth and said point, filling said groove with high tensile strength welding alloy, applying a layer of hard facing material extending over the point and weld.

3. The steps in the process of repointing a worn manganese tooth which comprises striking an arc between a welding rod of high nickel content and the work hardened surface of the worn tooth to convert said surface to austenite manganese and to apply a blocking layer of high nickel alloy on said surface, shaping a repoint to provide a V-groove when positioned in proximity to said surface, filling said groove with a high tensile strength welding alloy.

4. The steps in the process of repointing a worn manganese tooth which comprises striking an arc between a welding rod of high nickel content and the work hardened surface of the worn tooth to convert said surface to soft readily weldable material and to apply a blocking layer of high nickel content alloy on said surface, shaping a repoint to provide a V-groove when positioned in proximity to said surface, filling said groove with a rod of high tensile strength alloy, surface coating the finished weld with a rod of hard alloy.

5. The method of repointing a manganese tooth which comprises wash coating the work hardened surface of a worn tooth with a welding rod of high nickel content, providing a repoint of hard alloy, said repoint having a base substantially conforming to the shape of the worn tooth, tack welding said repoint to said tooth, welding said repoint to said wash with a high tensile strength alloy rod.

6. The method of repointing a manganese tooth which comprises wash coating the work hardened surface of a worn tooth with a welding rod of high nickel content, providing a repoint of hard alloy, said repoint having a base substantially conforming to shape of the worn tooth, the conforming edges being tapered, wash coating the tapered edge with a welding rod of high nickel content, arranging said wash coated surfaces in proximity, said tapered edge cooperating with the worn tooth to provide a V-shaped groove, substantially half filling said groove with a single pass of a high tension alloy welding rod, cooling the weld to approximately 600° F. finish filling the groove with the high tension alloy rod.

7. The method of repointing a manganese tooth which comprises wash coating the work hardened surface of a worn tooth with a welding rod of high nickel content, providing a repoint of hard alloy, said repoint having a base substantially conforming to shape of the worn tooth, the conforming edges being tapered, wash coating the tapered edge with a welding rod of high nickel content, arranging said wash coated surfaces in proximity, said tapered edge cooperating with the worn tooth to provide a V-shaped groove, substantially half filling said groove with a single pass of a high tension alloy welding rod, cooling the weld to approximately 600° F. finish filling the groove with the high tension alloy rod, wash coating the surface of the repoint and the weld with a welding rod of hard alloy.

8. The method of repointing worn manganese bucket teeth which comprises wash coating the work hardened worn surface with a welding rod having a high nickel content alloy, providing a repoint constructed of a hard alloy, shaping the rear edge of said repoint to provide with said worn surface a double V-shaped groove, wash coating the shaped rear edge with a welding rod of high nickel content alloy, assembling the repoint at a distance of the order of one-eighth inch from said worn surface, back welding said repoint in said assembled relation, substantially half filling one of said grooves with a heavy deposit with a welding rod of high tensile strength alloy, cooling the weld to a temperature of the order of 600°, finish filling the groove with the high tensile strength alloy rod, reversing the position of the parts to dispose the other of said grooves upwardly, substantially half filling the other groove with a heavy deposit with a welding rod of high tensile strength alloy, again cooling the weld to a temperature of the order of 600°, finish filling the groove with the high tensile strength alloy rod, and wash coating the surface of the weld with a welding rod of hard alloy.

References Cited in the file of this patent

UNITED STATES PATENTS

| | | |
|---|---|---|
| 1,635,217 | Kirchman | July 12, 1927 |
| 2,148,925 | Bochy | Feb. 28, 1939 |
| 2,285,455 | Newell | June 9, 1942 |
| 2,369,285 | Daniels et al. | Feb. 13, 1945 |
| 2,603,985 | Vidmar | July 22, 1952 |
| 2,608,111 | Ratkowski | Aug. 26, 1952 |